(12) United States Patent
Grimald (10) Patent No.: US 10,867,521 B2
(45) Date of Patent: Dec. 15, 2020

(54) AIRCRAFT MISSION COMPUTING SYSTEM, COMPRISING A COMPUTING ENGINE FOR COMPUTING AN AIRCRAFT TRAJECTORY DURING THE MISSION AND RELATED PROCESS

(71) Applicant: DASSAULT AVIATION, Paris (FR)

(72) Inventor: Cyrille Grimald, Boulogne (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 16/198,991

(22) Filed: Nov. 23, 2018

(65) Prior Publication Data

US 2019/0164438 A1 May 30, 2019

(30) Foreign Application Priority Data

Nov. 24, 2017 (FR) ...................... 17 01235

(51) Int. Cl.
*G08G 5/00* (2006.01)
*G01C 21/34* (2006.01)

(52) U.S. Cl.
CPC ....... *G08G 5/0039* (2013.01); *G01C 21/3469* (2013.01); *G08G 5/006* (2013.01); *G08G 5/0021* (2013.01); *G08G 5/0034* (2013.01); *G08G 5/0047* (2013.01); *G08G 5/0091* (2013.01)

(58) Field of Classification Search
CPC .. G05D 1/0202; G05D 1/0676; G05D 1/0088; G05D 1/042; G05D 1/0005; G05D 1/0022; G05D 1/0094; G05D 1/104; B64C 39/024; B64C 2201/141; B64C 2201/024; B64C 2201/02; B64C 2201/126; B64C 2201/14; B64C 2201/206; G06Q 10/047; G08G 5/0013; G08G 5/003; G08G 5/0091; G08G 5/0034; G08G 5/0056; G08G 5/0095; G08G 5/0043; G08G 5/0069; G08G 5/0082; G08G 5/0026; G08G 5/006
See application file for complete search history.

(56) References Cited

U.S. PATENT DOCUMENTS

| | | | |
|---|---|---|---|
| 2013/0046422 A1* | 2/2013 | Cabos | G08G 5/0034 701/3 |
| 2016/0093222 A1* | 3/2016 | Hale | G08G 5/0039 701/120 |
| 2017/0011636 A1* | 1/2017 | Nefflier | G06F 8/20 |
| 2017/0227955 A1 | 8/2017 | Krupansky et al. | |

OTHER PUBLICATIONS

Search Report for priority application FR1701235.

* cited by examiner

*Primary Examiner* — Tuan C To
*Assistant Examiner* — Paul A Castro
(74) *Attorney, Agent, or Firm* — Davidson, Davidson & Kappel, LLC (57) ABSTRACT

An aircraft mission computing system includes a computing engine for computing aircraft trajectories during a mission that comprises a trajectory computing module capable of computing a mission trajectory between the geographical point of origin and the geographical destination point as a function of the airplane performance and operational mission specifications. The trajectory computing module is configured to compute at least one iso-movement curve of the aircraft, in particular at least one isochronous curve and/or at least one fuel iso-consumption curve from at least one point of the trajectory and is able to determine at least one other point of the trajectory on the iso-movement curve of the aircraft.

18 Claims, 3 Drawing Sheets

AIRCRAFT MISSION COMPUTING SYSTEM, COMPRISING A COMPUTING ENGINE FOR COMPUTING AN AIRCRAFT TRAJECTORY DURING THE MISSION AND RELATED PROCESS

The present invention relates to an aircraft mission computing system, comprising a computing engine for computing aircraft trajectories during the mission, the computing engine including:
- a module for initializing specifications of a mission including at least a geographical point of origin, a geographical destination point, and operational mission specifications;
- a module for recovering a weather context in the airspace between the geographical point of origin and the geographical destination point;
- a module for determining airplane performance, capable of determining airplane performance based on operational mission specifications and the weather context;
- a computing module for computing trajectories, capable of computing a mission trajectory between the geographical point of origin and the geographical destination point as a function of the airplane performance and operational mission specifications.

Such a computing system is in particular intended to be integrated into a cockpit, in parallel with a flight management system (FMS), to allow the crew to determine mission trajectories.

Alternatively, the computing system is able to be integrated into an offboard mission planning system, for example into an aircraft trajectory establishment airport infrastructure, and/or an electronic flight bag (EFB), optionally made up of a portable electronic device.

The preparation and definition of an aircraft mission between a first geographical point and a second geographical point is a time-consuming task. It in particular requires determining the route that the aircraft will follow, the associated flight profile, and the passenger, freight and fuel load. This definition is done based on a mission context including the weather, the airways to be followed, and an airplane context that includes the configuration and type of aircraft used, as well as its operating state.

BACKGROUND

In traditional civil aviation, the mission is relatively defined, since it generally consists of bringing passengers from a first geographical point to a second geographical point at a given time using known and repetitive commercial navigation routes.

Generally, airlines and/or outside suppliers have computing systems making it possible to provide a flight plan and expected aircraft performance, for example a required quantity of fuel.

Although changes may occur in the flight plan, they are generally minimal and often consist of shifting the schedule, for example to account for a slot change or weather difficulties.

In business aviation, the constraints weighing on the crew are greater. Clients sometimes require the crew to respect stricter mission criteria, for example regarding passenger comfort during the flight, the possibility of connecting to satellite transmission systems, available load, etc.

Furthermore, the mission conditions, in particular schedules, are highly variable, and the steps of the mission may change quickly based on passengers' specific needs.

SUMMARY OF THE INVENTION

In this context, the existing systems for providing flight plans are not fully satisfactory.

In particular, these systems are designed to operate on a sum of input criteria (speed, flight level, number of passengers, etc.) to which only one navigation solution will correspond. It is therefore frequently necessary to perform several iterations to adjust the mission hypotheses.

Furthermore, these systems operate by following preestablished airways, which result from radionavigation. These systems are based on the identification of an airway (ground track, i.e., the trajectory of the airplane projected on the ground), then a vertical optimization of the trajectory taking into account only the performance of the airplane (inherited from radionavigation). The route is therefore itself not optimized based on the mission context (constraint, criteria, weather, etc.).

In civil aviation, ground staff is often provided to lighten the burden of the crew and perform at least some of the preparation work.

However, in business aviation, the crew must often prepare the mission itself, taking into account the particular constraints of the passengers, and changes that may occur at any time during the mission.

One aim of the present disclosure is therefore to provide an aircraft mission computing system that allows the crew easily to find an optimal trajectory as a function of the desired route, the weather, client constraints and aircraft performance.

To that end, a system is provided that includes a trajectory computing module configured to compute at least one iso-movement curve of the aircraft, in particular at least one isochronous curve and/or at least one fuel iso-consumption curve from at least one point of the trajectory and is able to determine at least one other point of the trajectory on the iso-movement curve of the aircraft.

The system according to the invention may comprise one or more of the following features, considered alone or according to any technically possible combination:
- each point of the trajectory is located on an iso-movement curve relative to another point of the trajectory;
- the computing module is capable of choosing the other point of the trajectory on the iso-movement curve as a function of operational and/or performance airplane specifications;
- the trajectory computing module is configured to compute a plurality of iso-movement curves on several flight levels from the point of the trajectory;
- the computing module is configured to determine the iso-movement curves corresponding to a plurality of flight levels from an initial point to a first flight level change curve to define at least a first trajectory segment for each flight level, then the iso-movement curves from the first flight level change curve for a plurality of flight levels to another flight level change curve to define at least a second trajectory segment for each flight level, then next to define at least one trajectory by combining successive trajectory segments chosen from among the trajectory segments defined for each plurality of flight levels;
- the airplane performance determining module includes an application for computing aircraft weight and balance capable of computing a center of gravity of the aircraft and a high-speed performance computing application as a function of the computed center of gravity, and operational specifications of the aircraft, the computing module being capable of computing at least one mission parameter based on the mission trajectory by using at least the high-speed performance computing application;

the trajectory computing module is capable of computing a first given trajectory and determining, based on the given first trajectory, at least one mission parameter of the aircraft, then computing at least one other given trajectory of the aircraft, until the mission parameter converges toward a desired mission parameter value;

the mission parameter is a weight at takeoff or landing of the aircraft to perform the mission trajectory or a total distance traveled by the aircraft over the mission trajectory;

the mission parameter is a weight at takeoff or landing of the aircraft on a given terrain, the airplane performance determining module including a low-speed performance determining application capable of determining the maximum weight of the aircraft allowing the aircraft to take off and/or land on the given terrain, the computing module being able to verify that the weight at takeoff or landing of the aircraft obtained using the high-speed performance computing application is less than or equal to the maximum weight allowing the aircraft to take off or land on the given terrain obtained using the low-speed performance determining application;

the or each operational specification includes an airplane context, in particular a type of defective equipment, a dispatch or a failure, and/or includes a mission context, in particular an imposed airway, a prohibited zone or a desired passage zone, the airplane performance determining module being able to determine the airplane performance as a function of the airplane context and/or the mission context.

the system is received in an aircraft cockpit, in an offboard computer or in a portable electronic device.

An aircraft mission trajectory computing method is provided, comprising providing a computing system as cited above, the computing system carrying out the following steps:

acquiring specifications of a mission including at least a geographical point of origin, a geographical destination point, and operational mission specifications, with the initialization module;

recovering a weather context in the airspace between the geographical point of origin and the geographical destination point via the recovery module;

determining airplane performance, as a function of operational mission specifications and the weather context via the determining module;

computing at least one airplane trajectory between the geographical point of origin and the geographical destination point as a function of the airplane performance and operational mission specifications, the trajectory computation comprising computing at least one iso-movement curve of the aircraft, in particular at least one isochronous curve and/or at least one fuel iso-consumption curve, from at least one point of the trajectory, and determining at least one other point of the trajectory on the isochronous curve.

The method according to the invention may comprise one or more of the following features, considered alone or according to any technically possible combination:

each point of the trajectory is located on an iso-movement curve relative to another point of the trajectory;

it comprises the choice, by the computing module, of the other point of the trajectory on the iso-movement curve as a function of operational and/or performance airplane specifications;

it comprises the computation, by the trajectory computing module, of a plurality of iso-movement curves on several flight levels from the point of the trajectory;

the computation by the computing module comprises an aircraft weight and balance computation in order to compute a center of gravity of the aircraft, a high-speed performance computation of the aircraft as a function of the computed center of gravity, and operational specifications of the aircraft, and a computation of a mission parameter based on the mission trajectory by using the high-speed performance computing application;

it comprises the computation, by the computing module, of a first given trajectory, and the determination, based on the given trajectory, of the value of at least one mission parameter of the aircraft, then the computation, by the computing module, of at least one other given trajectory of the aircraft and one other value of the mission parameter of the aircraft, until a convergence criterion on the value of the mission parameter of the aircraft is reached.

BRIEF SUMMARY OF THE DRAWINGS

The invention will be better understood upon reading the following description, provided solely as an example and done in reference to the appended drawings, in which.

DETAILED DESCRIPTION

Figure 1:
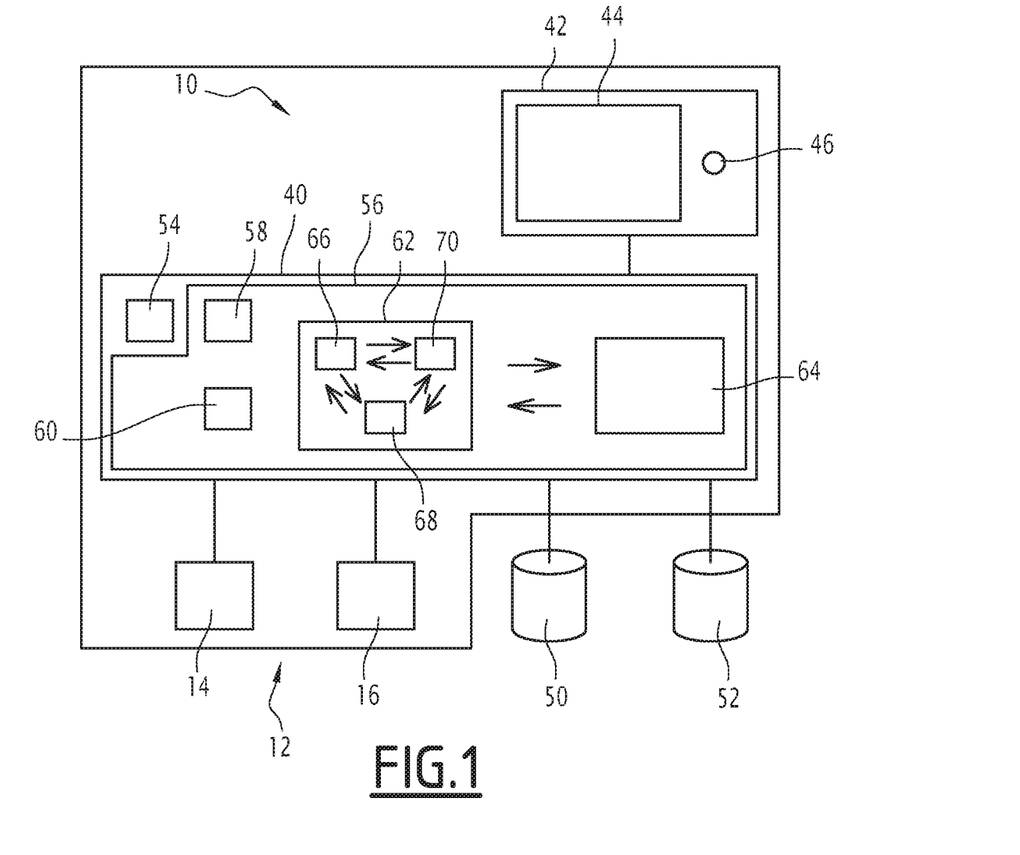
FIG. 1 is a block diagram illustrating a first mission computing system according to an embodiment of the invention, integrated into a cockpit of an aircraft.

A first mission computing system 10 according to an embodiment of the invention, present in the cockpit 12 of an aircraft, is illustrated by FIG. 1.

The aircraft is preferably a civilian aircraft, preferably a business jet.

In a known manner, the cockpit 12 of the aircraft is intended to control all of the systems of the aircraft during its use.

The cockpit 12 in particular includes, aside from the mission computing system 10, a flight management system (FMS) 14 and a system 16 for managing and monitoring the various airplane systems.

The flight management system 14 is intended to aid the pilot of the aircraft in navigating the aircraft during a mission. It is able to provide information in particular on the route followed by the aircraft, and the evolution parameters of the aircraft, such as the fuel consumption.

Figure 3:
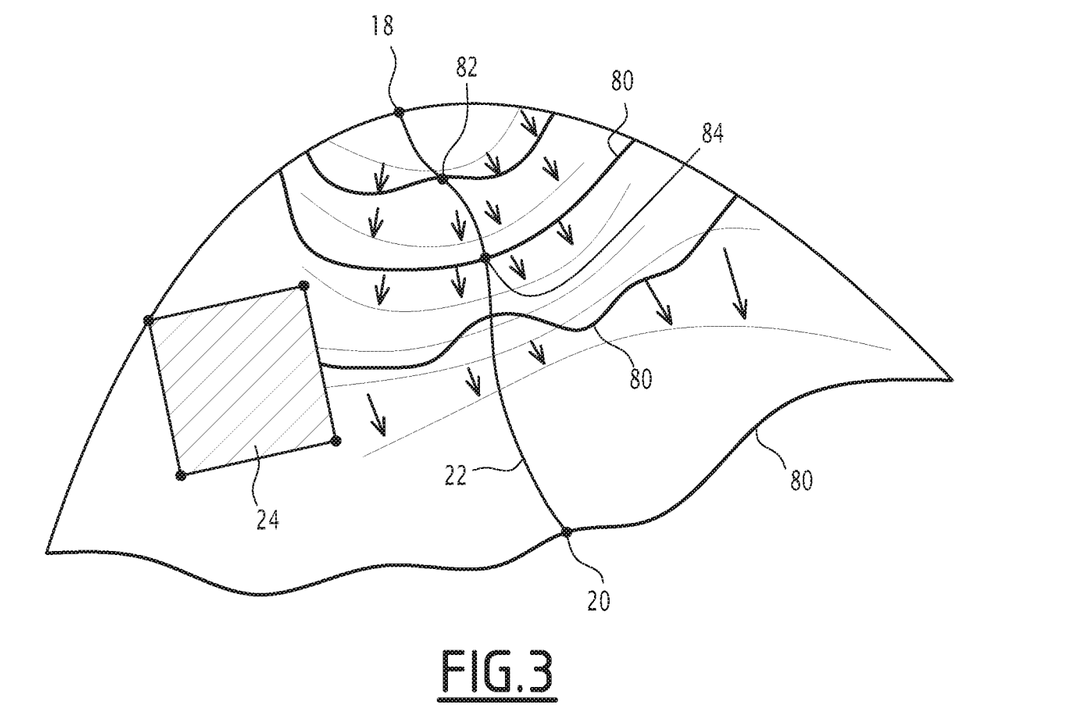
FIG. 3 is a schematic view illustrating the computation principle of isochronous curves from a given point in the navigation zone of the aircraft.
Figure 4:
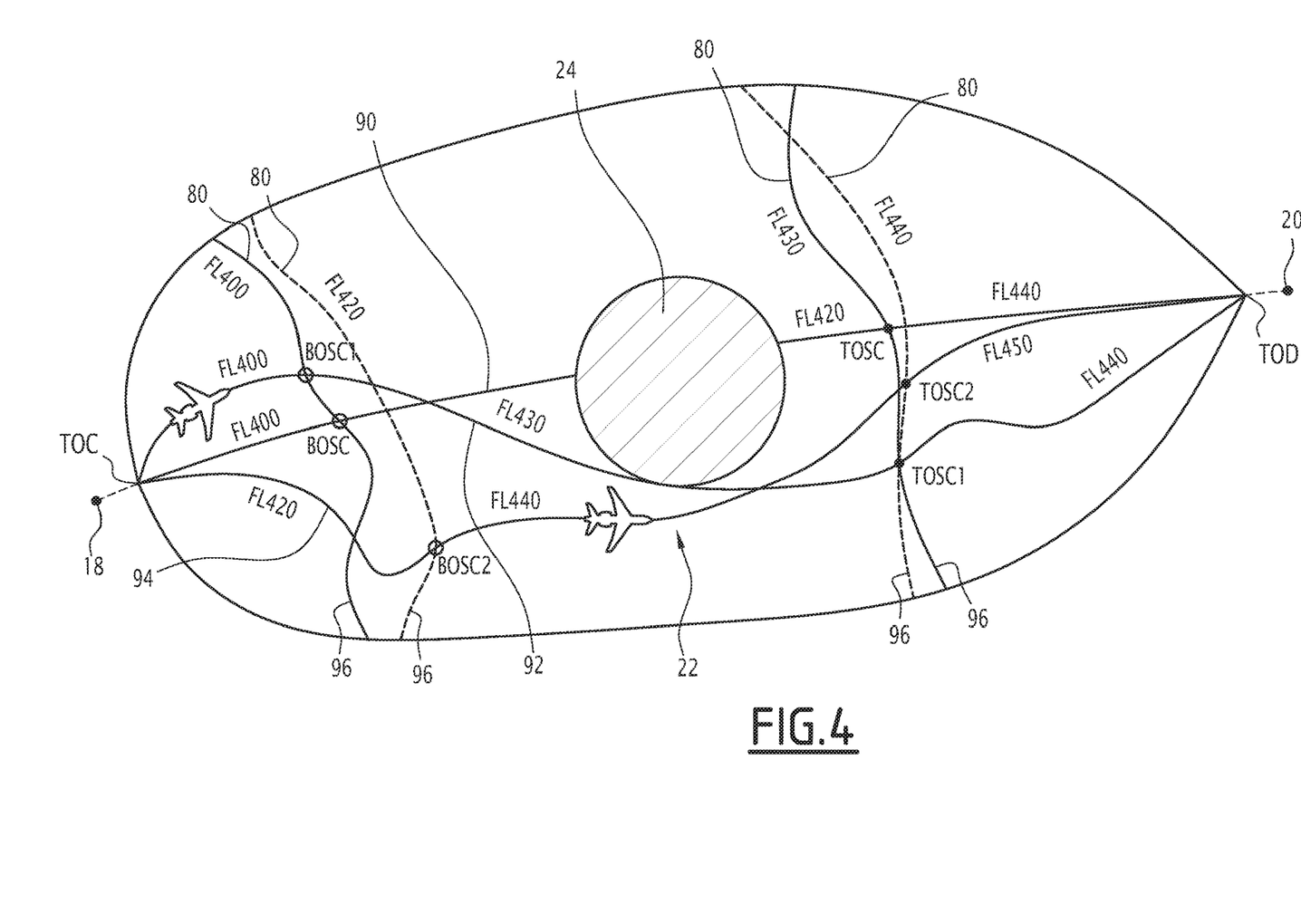
FIG. 4 is a schematic top view illustrating the implementation of a trajectory computation method using the computing engine of the mission computing system according to an embodiment of the invention.

It is also able to guide the aircraft to cause it to follow a preset trajectory between a first geographical point of origin 18 and a second destination geographical point 20 (shown schematically in FIGS. 3 and 4).

The system 16 for managing and monitoring the various airplane systems is in particular intended to allow the crew to monitor and optionally control all of the aircraft systems. It is in particular capable of determining an operating state of the aircraft, in particular in the presence of flaws and failures present on the aircraft on the ground and/or in flight. As will be seen below, the mission computing system 10 is connected to the system 16 for taking the state of the airplane into account in mission computations.

The mission carried out by the aircraft comprises at least one step 22 (or leg) between a first geographical point of origin 18 and a second destination geographical point 20. In some cases, the mission performed by the aircraft includes a plurality of successive legs 22, the second geographical destination point 20 of a first leg constituting the first geographical point of origin 18 of a second leg.

The mission is carried out by following operational specifications that in particular comprise a mission context and an airplane context.

The mission context for example includes at least one operating constraint, in particular a number of passengers to be carried, a maximum weight at takeoff in particular related to an available runway length, a navigation fuel load, a reserve fuel load, an imposed takeoff time and/or arrival time, a maximum distance to be traveled and/or a distance to an alternative terrain en route.

Figure 2:
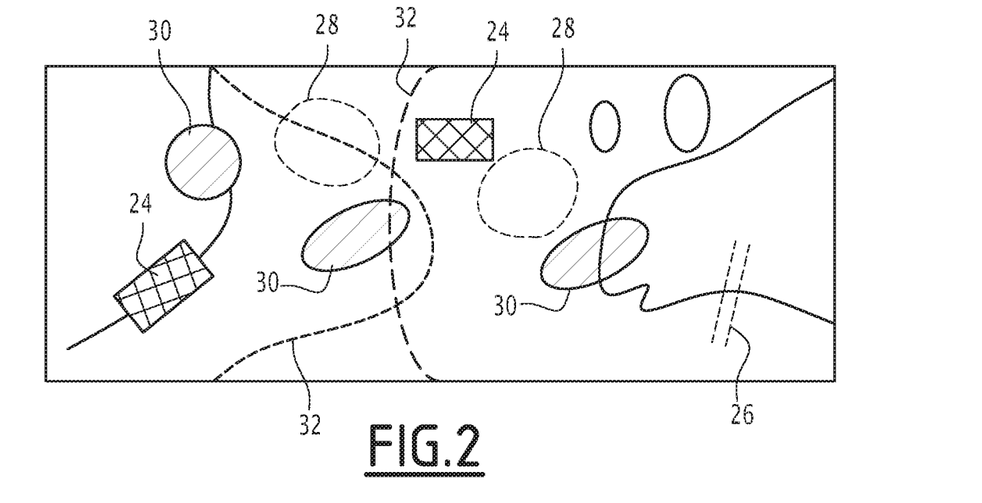
FIG. 2 is a schematic view of a navigation zone of the aircraft in which there are turbulent regions, regions not meeting the comfort criteria of the mission and satellite telecommunications coverage regions.

In reference to FIG. 2, the mission context advantageously comprises navigation constraints, for example prohibited zones 24 or flight levels, imposed airways 26 or flight levels, or more globally free flight zones and/or flight zones imposed by the airways.

The mission context advantageously comprises weather constraints such as ice formation or weather avoidance zones 28 (cumulonimbus, for example).

The mission context optionally comprises passenger comfort constraints, in particular turbulence zones 30 to be avoided, in particular based on the desired turbulence level, for example chosen from a low level, a medium level, and a high level of turbulence, or satellite telecommunications coverage zones 32 in order to allow telecommunications between the aircraft and the outside world in particular on the ground, in particular chosen from among a low level, a medium level and a good level of communication possibilities.

The airplane context may comprise usage constraints related to dispatches and/or constraints related to a particular state of the aircraft in terms of defects and/or failures on one or several pieces of equipment of the aircraft.

For example, a dispatch related to certain defects of the aircraft may impose a maximum flight level and/or a maximum speed. A failure to retract the landing gear or a flap may also impose an increased fuel consumption constraint.

The mission computing system 10 is intended to establish a trajectory of the aircraft to perform step 22 between at least a first geographical point of origin 18 and at least one second destination geographical point 20, taking account of the operational specifications, and in particular the mission context and the airplane context.

The trajectory obtained using the mission computing system 10 includes the route of the aircraft in latitude and longitude, as well as the altitude speed profile.

Advantageously, the mission computing system 10 is further capable of establishing flight plan parameters, in particular the weight and balance of the aircraft, the takeoff and landing target (i.e., the flight data for the pilot relative to guiding such as the speeds V1, V2, VR on the runway, the acceleration upon releasing the brakes, the engine speed upon takeoff, and/or the attitude upon takeoff) as well as the computation of the limit weights on takeoff and landing, the weather at low speed (i.e., on the surface) and high speed (i.e., en route), the air traffic control information ("Automated Terminal Information Service" ATIS, "Notice to airmen" e-NOTAM, "Flight Information RegionS" FIRS, air traffic control broadcasting services), and/or available alternative terrains at destination, and along the way.

In reference to FIG. 1, the mission computing system 10 comprises a computing engine 40 and advantageously a user interface 42 for configuring and retrieval forming a mission deck.

The user interface 42 for example comprises at least one screen 44 and at least one member 46 for selecting and entering information by the user, which can be a real or virtual keyboard, a mouse and/or a touch-sensitive system.

The user interface 42 is able to allow the user to enter at least some of the operational specifications, in particular the geographical origin and destination points 18, 20, waypoints, desired times, desired loads, a maximum wind on the trajectory, etc.

It is advantageously able to allow the user to define at least a portion of the mission context, in particular the navigation and passenger comfort constraints, and/or to define at least a portion of the airplane context.

An example interface 42 is described in the patent application titled "Aircraft mission computing system comprising a mission deck and associated method" filed jointly by the Applicant.

The computing engine 40 is connected to the interface 42. It is advantageously also connected to the flight management system 14, to the management and monitoring system 16.

It is able to query a weather database 50 and/or a navigation information database 52, for example via a data network, in particular a wireless data network.

The weather database 50 contains current and predictive weather information in the navigation zone of the aircraft between the point of origin 18 and the destination point 20.

This weather data is provided on several flight altitude levels, for example every 304 m (1000 feet), at an altitude for example between 0 m and 15,545 m (51,000 feet).

The weather data is provided in terms of altitude, but also "around the flight plan" to provide a weather component evolving over time.

This weather data in particular includes the speed and direction of the wind, temperature, pressure, precipitation, dangerous phenomena (ice, storms/cumulonimbus), turbulence, tropopause level, volcanic ash clouds, dust/sand clouds, visibility, as well as aeronautic observations over the zone or route (METAR, TAF, PIREPS), etc. It optionally includes the definition and evolution over time and space of the geographical coordinates of ice formation or weather avoidance zones 28 and/or turbulence zones 30.

The navigation information database 52 contains informational data on terrain at the point of origin 18 and the destination point 20, and between these points 18, 20. The navigation information database 52 advantageously comprises a navigation sub-database (waypoints, routes, etc.)

and an airport sub-database (runway lengths, runway orientations, flight path angles, etc.).

It advantageously contains the definition of the geographical coordinates of prohibited zones and/or flight levels 24, in particular due to geopolitical data, and/or imposed airways 26.

It optionally comprises the definition of satellite telecommunications coverage zones 32.

The computing engine 40 comprises at least one computer including at least a processor 54 and a memory 56. The memory 56 contains software modules capable of being executed by the processor 54.

In particular, the memory 56 contains a software module 58 for initializing mission specifications, capable of acquiring operational specifications of the mission in particular from the interface 42, and a software module 60 for recovering weather data from the database 50.

The memory 56 further contains a software module 62 for determining airplane performance, as a function of mission specifications and weather data, and a software module 64 for computing an airplane trajectory, as a function of the determined airplane performance, weather data and mission specifications.

The initialization module 58 is capable of acquiring the operational specifications of the mission from the interface 42, and/or from the management and monitoring system 16.

The recovery module 60 is capable of querying the weather database 50 in particular to obtain the speeds and directions of the wind between the point of origin 18 and the destination point 20, at several flight levels.

The determining module 62 comprises a software application 66 for determining the weight and balance of the aircraft, intended to determine the center of gravity of the aircraft, a software application 68 for determining high-speed performance, and advantageously a software application 70 for determining low-speed performance.

The application 66 for determining the weight and balance of the aircraft is capable of determining the position of the center of gravity of the aircraft with no fuel in the aircraft (or Zero Fuel Weight Center of Gravity) and the weight of the aircraft with no fuel in the aircraft (or Zero Fuel Weight), based on the empty weight of the aircraft, equipment on board the aircraft, passengers and/or freight on board, and in their position in the aircraft, as well as monitoring of the flight envelope of the aircraft (weight-centering diagram).

The application for determining high-speed performance 68 is capable of determining the weight of fuel to be placed on board the aircraft on a given trajectory, for example an orthodromic trajectory between the point of origin 18 and the destination point 20, using the position of the center of gravity and the weight of the aircraft with no fuel in the aircraft (or Zero Fuel Weight) determined by the application 66, a preset airspeed, for example entered or computed from data entered by the user interface 42, weather data recovered from the module 60, in particular wind speeds and temperatures, and optionally the airplane context, for example the type and age of the engines, recovered from the initialization module 58.

The application for determining low-speed performance 70 is capable of determining in particular the maximum weight of the aircraft (and the takeoff target) allowing the aircraft to take off and/or land on terrain, based on runway length data recovered from the database 52, and weather data recovered from the module 60.

The computing module 64 is configured to compute at least one iso-movement curve of the aircraft, in particular at least one isochronous curve and/or at least one fuel iso-consumption curve, from at least one point of the trajectory, and to determine the position of at least one other point of the trajectory on the iso-movement curve of the aircraft.

The computing module 64 is capable of computing at least one trajectory 22 between the point of origin 18 and the destination point 20 by determining iso-movement curves of the aircraft, in particular isochronous curves 80.

In the example illustrated by FIGS. 3 and 4, the computing module 64 is capable, from any point 82 of a trajectory 22 in progress, of establishing an isochronous curve 80 over a preset time increment from a point 82 of the trajectory, taking account of the selected airspeed, weather data, airplane performance determined by the determining module 62, in particular using the applications 66 and 68, and operational specifications defined by the initialization module 58. It is next able to choose a trajectory by basing itself on the determined isochronous curves 80.

By definition, an isochronous curve 80 is a curve connecting the points accessible to the aircraft from a given point 82 at a given time, which corresponds to one or several time increments. Each time increment is for example between 10 minutes and 1 hour, in particular between 15 minutes and 30 minutes.

In this example, each isochronous curve 80 is determined from a given point 82 by computing, from the given point 82, all of the points accessible to the aircraft, at a given airspeed, taking account of the weather data, in particular the wind direction and intensity, as provided by the recovery module 60 and the airplane performance, as determined by the determining module 62.

Advantageously, the computing module 64 is able to compute a series of isochronous curves 80, by computing, from each point 82 of a given isochronous curve 80, all of the points accessible to the aircraft during a given time for the given speed and/or for the given fuel consumption, then repeating this computation from any point of the isochronous curve 80 thus computed.

The computing module 64 is capable of selectively excluding the points that are located in the prohibited flight zones or levels 24, in ice formation or weather event zones 28 and/or in turbulent zones 30. On the contrary, the computing module 24 is also able to exclude the points that are not located in a satellite coverage zone 32 or along an imposed airway 26.

Advantageously, the computing module 64 is able to compute the isochronous curves 80 from a point 82, located at a first flight level at the same flight level as the point 82, and at several flight levels adjacent to the first flight level above and below the first flight level.

The computing module 64 is next able to define a trajectory 22 by choosing, on the successive isochronous curves 80, successive points of the trajectory 22.

To define the trajectory 22, the trajectory computing module 64 is capable of computing a first given trajectory 92 (see FIG. 4) and determining, based on the given trajectory 92, at least one mission parameter of the aircraft, then computing a series of given trajectories 94 of the aircraft, until the mission parameter converges toward a desired mission parameter value.

The mission parameter is for example a total weight of the aircraft at takeoff. This weight at takeoff is computed by the software application 68 based on the estimated consumption on the trajectory between the point of origin 18 and the destination point 20 and based on a passenger and freight load predefined in the operational specifications.

The computing module 64 is thus able to perform calculating iterations successively using the applications 66, 68, varying the trajectories until achieving a convergence on the value of the mission parameter.

Upon each iteration, the computing module 64 is in particular able to verify that the weight at takeoff obtained using the applications 66, 68 is less than or equal to the maximum weight allowing the aircraft to takeoff obtained using the application 70 to ensure that the aircraft can take off on the terrain chosen for takeoff.

A mission computing method, implemented using the system 10, will now be described. This method is for example implemented during the preparation of the mission, to establish its feasibility, to prepare the mission more precisely, or to account for a last-minute change in a mission that has already been prepared.

Alternatively, this method is implemented during monitoring of the mission, or to test change hypotheses of the mission, to optimize it, or to reconfigure it.

Initially, the user, in particular the crew, enters at least a portion of the operational specifications using the configuration interface 42. The user for example defines, for each step of the mission, the geographical point of origin 18, the geographical destination point 20, and optionally, a number of passengers to be transported, a desired airspeed, an imposed departure time and/or arrival time, a maximum distance to be traveled.

Then, when he wishes to define a possible trajectory 22, he activates the computing engine 40. The initialization module 58 recovers the operational specifications in particular from the interface 42 in order to obtain all of the information on each step of the mission.

The initialization module 58 advantageously recovers other operational specifications from the management and monitoring system 16 of the aircraft.

This step initializes the operational specifications related to the mission context and the airplane context, for example the presence of failures or dispatches. This step also initializes the passenger comfort operational specifications, in particular in terms of connectivity and turbulence level. This step for specifying acceptable weather data is advantageously done at the user interface 42.

The initialization is done considering a purely orthodromic trajectory in a standard atmosphere ("perfect" flight data).

Then, the weather data recovery module 60 queries the weather database 50 in particular to obtain the speeds and directions of the wind between the point of origin 18 and the destination point 20, at several flight levels.

The airplane performance determining module 62 is then activated. The application 66 for determining the weight and balance determines the weight of the aircraft and the center of gravity of the aircraft (Zero Fuel Weight and Zero Fuel Weight Center of Gravity), based on the empty weight of the aircraft, equipment on board the aircraft, passengers and/or freight on board, and their position in the aircraft.

On this basis, based on the weather data recovered by the recovery module 60, based on the airplane context recovered from the initialization module 58, and based on the desired airspeed, the high-speed performance determining application 68 determines an initial trajectory 90 of the aircraft and the associated consumption of the aircraft using the position of the center of gravity determined by the application 66.

As illustrated by FIG. 4, it computes an orthodromic initial trajectory 90 in a standard atmosphere using one or several altitude flight levels.

It then computes the set of mission parameters, in particular the route, the arrival time, the flight profile and the fuel consumption, which in particular makes it possible to deduce the weight at takeoff therefrom.

The trajectory computation module 64 is then implemented. Based on the weight at takeoff previously obtained, the module 64 computes a first optimized trajectory 92 by determining the iso-movement curves of the aircraft, here the isochronous curves 80, from a top of climb (TOC) computed from the position of the point of origin 18 to a top of descent (TOD) computed from the position of the destination point 20.

The iso-movement curves of the aircraft are determined by time increments, for several combinations of vertical flight levels (FL400, FL420, etc.), for example choosing, as base, the flight levels defined by the previous trajectory.

The computing module 64 in particular accounts for the prohibited flight zones 24 or levels, ice formation zones 28 to be avoided, turbulence zones 30 to be avoided, imposed airways 26 and/or satellite coverage zones 32.

For each flight level, the computing module 64 chooses, from each point 82 of the trajectory, a later point of the trajectory located on an isochronous curve 80. The computing module 64 thus defines one possible trajectory segment associated with each flight level.

The computing module 64 limits the number of possible flight levels for each increment while keeping the flight level constant up to at least one flight level change curve 96. The flight level change curve 96 is for example defined for each flight level by a given fuel dumping, corresponding to a predefined flight duration at constant Mach, for example between 1 h and 2 h.

The computing module 64 next defines a trajectory 92 by choosing the trajectory segments corresponding to the combination of vertical flight levels that is optimal in each iteration.

Thus, in the example shown in FIG. 4, the computing module determines the iso-movement curves corresponding to a plurality of flight levels (e.g., FL400 and FL420) from an initial point (here the TOC) to the first flight level change curve 96 to define at least a first trajectory segment [TOC; BOSC1], [TOC; BOSC2] for each flight level, then the iso-movement curves from the first flight level change curve 96 for a plurality of flight levels (here FL430, FL440) to another flight level change curve 96 to define at least a second trajectory segment [BOSC1; TOSC1], [BOSC2; TOSC2] and repeats these computations until reaching a final point (here the TOD). It next defines at least one trajectory 92 by associating successive trajectory segments from among the trajectory segments defined for each plurality of flight levels between the flight level change curves 96.

It then computes the set of mission parameters like before, and determines the difference between the mission parameter to be optimized (for example, the weight at takeoff) for the initial trajectory 90 and the mission parameter to be optimized for the trajectory 92.

It then performs new trajectory computations, as previously described, by using the isochronous curves 80 until the mission parameter, here the weight at takeoff, converges toward a desired mission parameter value.

The convergence is for example determined when the difference between the value of the mission parameter for the trajectory determined in the previous iteration and that determined in the current iteration is below a predetermined value.

In particular, in the case of the weight at takeoff, the difference between the weight at takeoff for the trajectory determined in the previous iteration and that determined in the current iteration must be below a predetermined weight, for example equal to 100 pounds.

Alternatively, the mission parameter is the weight at landing or the distance traveled along the trajectory.

Advantageously, upon each iteration or after convergence, the low-speed performance determining software application 70 is implemented to verify that the obtained mission parameters are compatible with the terrain on which the aircraft is intended to take off and/or land.

When the convergence is reached, an optimized final trajectory 94 is obtained. The computing module 64 then precisely determines the mission parameters, in particular the route followed, the weight and balance of the aircraft, the takeoff and landing target, using the low-speed performance application 70, the high-speed and low-speed weather.

Optionally, the computing module 64 queries the navigation information database 52 in order further to obtain the air traffic control information (ATIS broadcasting service, e-NOTAM, telecommunications frequency, FIRS for "Flight Information RegionS", air traffic control center), and/or alternative terrain available at destination, and en route.

Then, the interface 42 displays at least some of the mission parameters, in particular the route followed and the flight profile.

In the example described above, the trajectory 22 is optimized at a given airspeed to obtain the lowest possible fuel weight, while respecting the operational specifications.

In one alternative, in particular when the departure terrain has a short runway or an obstacle to be crossed at the end of the runway, the low-speed performance determining software application 70 is implemented upon initializing the method to determine the maximum weight that can be taken on board (fuel+payload). The maximum fuel weight that can be taken on board in light of the payload is then used as a constraint by the trajectory computing module 64.

The value of this constraint can then be modified by the crew, in particular by modifying the number of passengers and/or the on-board freight weight.

The computing system 10 is therefore particularly effective to determine optimal trajectories of an aircraft during a mission, much more precisely than with the traditional commercial tools, since the trajectory computation is done using the isochrone method, taking into account the mission context and the airplane context.

This allows the obtained trajectories to be particularly suitable for the zones 24, 28, 30 to be avoided, and to follow, on the contrary, the routes 26 and zones 32 in which the aircraft must circulate.

The crew may further easily modify one or the other of the mission specifications based on user imperatives, or last-minute changes, while obtaining fast results in the computation.

Figure 5:
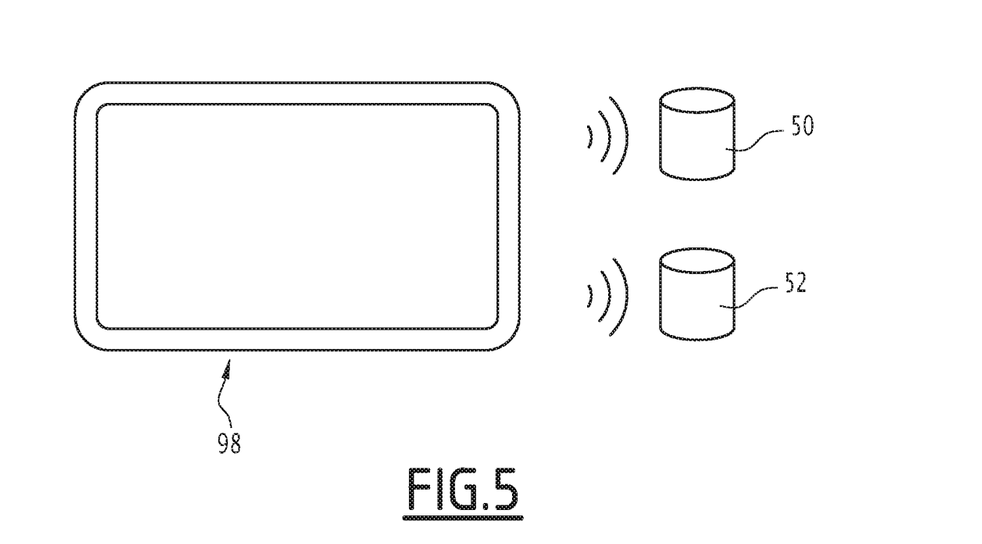
FIG. 5 is a schematic view illustrating a second mission computing system according to an embodiment of the invention, integrated into an electronic flight bag.

In the alternative illustrated in FIG. 5, the computing system of 10 is integrated within an electronic flight bag (EFB) for example assuming the form of a portable electronic device 98.

The portable electronic device is for example connected to the databases 50, 52 by a wireless datalink according to a wireless transmission protocol for example of the Wi-Fi type (for example according to Standard IEEE 802.11) or the Bluetooth type (for example according to Standard IEEE 802.15-1-2005).

In another alternative, each iso-movement curve computed by the computing module 64 is a fuel iso-consumption curve.

The computing module 64 is capable, from any point 82 of a trajectory 22 in progress, of establishing at least one fuel iso-consumption curve over a preset consumed fuel increment from a point 82 of the trajectory, taking account of the selected airspeed, weather data, airplane performance determined by the determining module 62, and operational specifications defined by the initialization module 58. It is next able to choose a trajectory by basing itself on the determined fuel iso-consumption curves.

By definition, a fuel iso-consumption curve is a curve connecting the points accessible to the aircraft from a given point 82 with a given fuel consumption, which corresponds to one or several consumed fuel increments. Each consumed time [sic] increment is chosen at a constant value for example comprised between 22.7 kg (50 pounds) and 453.6 kg (1000 pounds), in particular between 36.3 kg (80 pounds) and 54.4 kg (120 pounds).

In this example, each fuel iso-consumption curve is determined from a given point 82 by computing, from the given point 82, all of the points accessible to the aircraft, at a given airspeed, taking account of the weather data, in particular the wind direction and intensity, as provided by the recovery module 60 and the airplane performance, as determined by the determining module 62.

Advantageously, the computing module 64 is able to compute a series of fuel iso-consumption curves, by computing, from each point 82 of a given fuel iso-consumption curve, all of the points accessible to the aircraft for a given fuel increment for the given speed, then repeating this computation from any point of the fuel iso-consumption curve thus computed.

Like before, the computing module 64 is capable of selectively excluding the points that are located in the prohibited flight zones or levels 24, in ice formation or weather event zones 28 and/or in turbulent zones 30. On the contrary, the computing module 24 is also able to exclude the points that are not located in a satellite coverage zone 32 or along an imposed airway 26.

Advantageously, the computing module 64 is able to compute the fuel iso-consumption curves from a point 82, located at a first flight level at the same flight level as the point 82, and at several flight levels adjacent to the first flight level above and below the first flight level.

The computing module 64 is next able to define a trajectory 22 by choosing, on the successive fuel iso-consumption curves, successive points of the trajectory 22.

In one alternative of the computing methods previously described (isochronous or iso-fuel), the trajectory is modified upon each iteration done by the computing module 64 only on a vertical plane, following a predefined trajectory in the horizontal plane (for example a predefined navigation route) and optimizing only the flight levels.

In another alternative, the computing module 64 modifies the vertical trajectory as well as the horizontal trajectory, but only on predefined airways.

In still another alternative, the computing module 64 modifies the vertical trajectory and the horizontal trajectory by authorizing direct movements toward a given passage point ("direct to") and limited lateral modifications relative to a predefined airway.

Lastly, the computing module 64 can apply one or the other of these alternatives on a single and same flight by applying pivot points that for example correspond to different air spaces with different regulations.

In another alternative, the trajectory 92 is computed by the computing module 64 by proceeding from the geographical destination point 20 toward the geographical point of origin 18.

What is claimed is:

1. An aircraft mission computing system, comprising a computing engine configured to compute an aircraft trajectory for a mission, the computing engine comprising a memory and a processor configured to control the aircraft mission computing system via instructions from the memory to:
    initialize mission specifications of a mission, the mission specifications including at least a geographical point of origin, a geographical destination point, and operational mission specifications;
    recover a weather context in an airspace between the geographical point of origin and the geographical destination point;
    determine airplane performance based on the operational mission specifications and based on the weather context;
    compute a mission trajectory between the geographical point of origin and the geographical destination point as a function of the airplane performance and as a function of the operational mission specifications; and
    compute at least one isochronous curve or fuel iso-consumption curve of the aircraft from at least one point of the mission trajectory and being configured to determine at least one other point of the mission trajectory on the at least one isochronous curve or fuel iso-consumption curve of the aircraft,
    the isochronous curve being a curve connecting possible alternative points accessible to the aircraft in the future from a given point at a given time in a time increment, the possible alternative points on the isochronous curve only capable of being part of the mission trajectory independent of each other,
    the fuel iso-consumption curve being a curve connecting possible alternative points accessible to the aircraft from the given point with a given fuel consumption in a consumed fuel increment, the possible alternative points on the fuel iso-consumption curve only capable of being part of the mission trajectory independent of each other.

2. The system according to claim 1, wherein each point of the mission trajectory is located on the at least one isochronous curve or fuel iso-consumption curve relative to another point of the mission trajectory.

3. The system according to claim 2, wherein the computing engine is configured to determine the at least one other point of the mission trajectory on the at least one isochronous curve or fuel iso-consumption curve as a function of operational or performance airplane specifications.

4. The system according to claim 1, wherein the computing engine is configured to compute a plurality of isochronous curves or fuel iso-consumption curves on a plurality flight levels from the at least one point of the mission trajectory.

5. The system according to claim 4, wherein the computing engine is configured to determine the plurality of iso-chronous curves or fuel iso-consumption curves on the plurality of flight levels from an initial point to a first flight level change curve and to define at least a first trajectory segment for each flight level between the initial point and the first flight level change curve,
    the computing engine being configured to subsequently determine the plurality of iso-movement curves from the first flight level change curve for the plurality of flight levels to a second flight level change curve and to define at least a second trajectory segment for each of the plurality of flight levels between the first flight level change curve and the second flight level change curve,
    the computing engine being configured to subsequently define at least one trajectory by combining successive trajectory segments chosen from among the first and second trajectory segments defined for each plurality of flight levels.

6. The system according to claim 1, wherein the computing engine is configured to compute a center of gravity of the aircraft and to compute at least an aircraft performance en-route as a function of the computed center of gravity, and as a function of the operational mission specifications of the aircraft, the computing engine being configured to compute at least one mission parameter based on the mission trajectory by using the aircraft performance en-route.

7. The system according to claim 6, wherein the at least one mission parameter is a weight at takeoff or a weight at landing of the aircraft adapted for the aircraft to carry out the mission trajectory or the at least one mission parameter is a total distance traveled by the aircraft over the mission trajectory.

8. The system according to claim 6, wherein the at least one mission parameter is a weight at takeoff or a weight at landing of the aircraft on a given terrain, the computing engine configured to determine a maximum weight of the aircraft allowing the aircraft to take off or land on the given terrain,
    the computing unit being configured to verify that the weight at takeoff or the weight at landing of the aircraft obtained using the aircraft perfomance en-route is less than or equal to the determined maximum weight allowing the aircraft to take off or land on the given terrain obtained using the computing engine.

9. The system according to claim 1, wherein the computing engine is configured to compute a first given trajectory,
    the computing engine being configured to determine, based on the first given trajectory, at least one mission parameter of the aircraft,
    the computing engine being configured to subsequently compute at least one other given trajectory of the aircraft, until the at least one mission parameter converges toward a desired mission parameter value.

10. The system according to claim 1, wherein at least one of the operational mission specifications includes an airplane context or includes a mission context, the computing engine being configured to determine the airplane performance as a function of the airplane context or of the mission context.

11. The system according to claim 10, wherein the airplane context is a type of defective equipment, a dispatch or a failure.

12. The system according to claim 10, wherein the mission context is an imposed airway, a prohibited zone or a desired passage zone.

13. An aircraft mission trajectory computing method, comprising:
    acquiring specifications of a mission including at least a geographical point of origin, a geographical destination point, and operational mission specifications;
    recovering a weather context in the airspace between the geographical point of origin and the geographical destination point;
    determining airplane performance, as a function of operational mission specifications and of the weather context;
    computing at least one mission trajectory between the geographical point of origin and the geographical destination point as a function of the airplane performance and operational mission specifications, the computing of the at least one mission trajectory comprising computing at least one isochronous curve or fuel iso-consumption curve of the aircraft from at least one point of the at least one mission trajectory, and determining at least one other point of the at least one airplane trajectory on the at least one isochronous curve or fuel iso-consumption curve, the isochronous curve being a curve connecting possible alternative points accessible to the aircraft in the future from a given point at a given time in a time increment, the possible alternative points on the isochronous curve only capable of being part of the mission trajectory independent of each other, the fuel iso-consumption curve being a curve connecting possible alternative points accessible to the aircraft from the given point with a given fuel consumption in a consumed fuel increment, the possible alternative points on the fuel iso-consumption curve only capable of being part of the mission trajectory independent of each other.

14. The method according to claim 13, wherein each point of the at least one mission trajectory is located on the at least one isochronous curve or fuel iso-consumption curve relative to another point of the at least one mission trajectory.

15. The method according to claim 13 wherein the determining of the at least one other point of the at least one airplane trajectory on the at least one isochronous curve or fuel iso-consumption curve is a function of the operational mission specifications and/or performance airplane specifications.

16. The method according to claim 13 wherein the computing of the at least one isochronous curve or fuel iso-consumption curve of the aircraft comprises computing a plurality of isochronous curves or fuel iso-consumption curves on several flight levels from the point of the at least one mission trajectory.

17. The method according to claim 16 the computing of the at least one mission trajectory comprises:

computing an aircraft weight and balance to compute a center of gravity of the aircraft, computing a performance en-route of the aircraft as a function of the computed center of gravity, and as a function of the operational mission specifications of the aircraft, and computing a mission parameter based on the at least one mission trajectory by using the performance en-route computation.

18. The method according to claim 13 wherein the computing of the at least one mission trajectory comprises:

computing a first given trajectory, and determining, based on the first given trajectory, a value of at least one mission parameter of the aircraft, then computing at least one other given trajectory of the aircraft and one other value of the at least one mission parameter of the aircraft, until a convergence criterion on the value of the at least one mission parameter of the aircraft is reached.

* * * * *